Patented Apr. 21, 1942

2,280,578

UNITED STATES PATENT OFFICE 2,280,578

AMIDES OF ALIPHATIC POLYCARBOTHI- ONIC ACIDS AND THEIR PREPARATION

William Edward Hanford and Paul Lawrence Salzberg, Wilmington, Del., assignors to E. I. du Pont de Nemours & Company, Wilmington, Del., a corporation of Delaware No Drawing. Application September 15, 1938, Serial No. 230,144

14 Claims. (Cl. 260—551)

This invention relates to organic compounds and more particularly to amides of higher aliphatic polycarbothionic acids and their preparation.

This invention has as an object the preparation of new organic compounds. A further object is the preparation of amides of higher polycarbothionic and particularly dicarbothionic acids. Another object is the preparation of compositions of use in controlling economically harmful lower forms of life. Another object is the preparation of lubricating oil corrosion inhibitors. Other objects will appear hereinafter.

These objects are accomplished by the following invention which comprises reacting hydrogen sulfide with an aliphatic polynitrile wherein the nitrile groups are separated by a chain of at least three carbon atoms contiguous therewith, in the presence of a basic substance, in particular an ammonia-type compound having one and only one ammonia-type nitrogen attached to at least one and preferably at least two hydrogen atoms, any valences of the ammonia-type nitrogen atom not satisfied by hydrogen being attached to aliphatic carbon which, when two valences of the nitrogen are attached to aliphatic carbons, forms part of one bivalent radical which, with the ammonia-type nitrogen, forms a heterocyclic ring. By "aliphatic carbon" is meant a carbon atom which is not a part of an aromatic ring.

One class of products coming within the scope of the present invention is that of primary amides of polycarbothionic acids having a chain of at least three carbon atoms between the carbothion- amide groups. The formula of these thioamides is

wherein R is a polyvalent aliphatic radical, having a valence $x$ which is preferably 2, which radical contains a chain of at least three carbon atoms between and contiguous with the thiocarbonyl carbons. These thioamides are prepared by reacting hydrogen sulfide with an aliphatic polynitrile wherein the nitrile groups are separated by a chain of at least three contiguous carbon atoms. The reaction should be carried out in the presence of catalytic quantities of an organic or inorganic base.

A second class is that of secondary thioamides of the formula

wherein R and $x$ are as above and R' is a monovalent radical attached to the NH group by an aliphatic carbon atom. These thioamides are prepared by reacting a polynitrile as above specified with hydrogen sulfide and a primary amine R'NH$_2$ wherein the radical R' is attached to the NH$_2$ group by an aliphatic carbon atom.

A third class is that of tertiary amides of polycarbothionic acids, said amides having the formula

wherein R and $x$ are as above and R$^2$ is a divalent organic radical attached to the thioamido nitrogen through aliphatic carbon atoms and forming with the thioamido nitrogen atom a heterocyclic ring. These thioamides are prepared by reacting a polynitrile as above specified with hydrogen sulfide and a heterocyclic secondary monoamine in which the amino nitrogen is part of a heterocyclic ring.

The invention is thus generic to thioamides of the formula

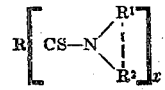

wherein R is a polyvalent aliphatic radical, of valence $x$, containing a chain of at least three carbon atoms between and contiguous with the thiocarbonyl groups, and wherein R$^1$ and R$^2$ are hydrogen or radicals joined to the amido nitrogen by aliphatic carbon, provided that, when neither is hydrogen, they form together (as indicated by the broken vertical line) a single divalent radical.

The reactions taking place in the present process are not definitely known, but it is believed that, in the preparation of the primary thioamides, the mechanism is one of direct addition of the hydrogen sulfide to the nitrile, as follows (R and $x$ being as above):

the ammonia which is ordinarily used acting merely as a catalyst. Evidence for this is that some thioamide is obtained in the absence of ammonia and in the presence of catalytic amounts of other bases, e. g. alkali metal alcoholates and sulfides.

In the preparation of the secondary and tertiary thioamides, the mechanism is apparently one in which a new carbon-nitrogen linkage is formed between the nitrile carbon and the amino-nitrogen, the nitrile nitrogen being split off as ammonia, the reaction, in the case of a primary amine, being as follows (R, R', and $x$ having values as above):

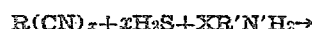
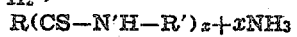

This theory and the evidence for it are given in more detail in copending application, Serial No. 230,141, filed of even date herewith. It is of course apparent that, regardless of the chemical reactions involved, the products and essential reactants are the same.

In a preferred mode of carrying out the present invention, one mol of the polynitrile is placed in a pressure vessel with a solvent such as ethyl or n-butyl alcohol. If a primary thioamide is to be prepared, this solution is then saturated with ammonia. If a secondary or tertiary thioamide is to be made, about 1.2 mols of the appropriate amine per nitrile group of the polynitrile is introduced. In either case, the solution is then cooled externally to about 0–5° C. with an ice-salt bath and saturated with hydrogen sulfide. The reaction vessel is closed and the mixture heated for about 6 to 10 hours at about 100–150° C., the time of heating varying inversely with the temperature. The vessel is then cooled and opened, the solvent distilled off, and the product isolated by crystallization from an appropriate solvent.

The reaction may also be carried out under atmospheric pressure by passing a steady stream of hydrogen sulfide through either type of reaction mixture while the latter is heated under reflux to the boiling point of the solvent, the introduction of hydrogen sulfide being continued until substantially no more is absorbed. Under these conditions approximately the same yield is obtained, but more hydrogen sulfide is required. This modification of the process may be desirable, however, when pressure equipment is not available, or when large scale operation with a suitable hydrogen sulfide recovery system is contemplated.

The more detailed practice of the invention is illustrated by the following examples, wherein parts given are by weight. There are of course many forms of the invention other than these specific embodiments.

Example I

Dithioadipamide

Twenty-one and six-tenths (21.6) parts of adiponitrile and 225 parts of ethyl alcohol are placed in a pressure vessel. While the vessel is cooled in an ice bath, the solution is made ammoniacal by bubbling ammonia into it for one minute, and it is then saturated with hydrogen sulfide. The vessel is sealed and heated for fifteen hours at 100° C., after which it is cooled and opened. The reaction mixture is filtered to separate the crude dithioadipamide. The filtrate is replaced in the pressure vessel, cooled, and saturated with hydrogen sulfide. The sealed vessel is heated for four hours at 100° C., cooled and opened, and the contents filtered. The hydrogen sulfide treatment of the filtrate is repeated to obtain a third portion of dithioadipamide. The crude product is crystallized from water. The purified dithioadipamide is a light brown crystalline solid, M. P. 172° C. with decomposition. Analysis: Calculated for $C_6H_{12}N_2S_2$: S, 36.34%. Found: S, 36.79%.

Example II

N,N'-di-n-octyldithioadipamide

Thirty-four and eight-tenths (34.8) parts of n-octylamine, 10.8 parts of adiponitrile and 75 parts of ethyl alcohol are placed in a pressure vessel and saturated with hydrogen sulfide while the vessel is cooled in an ice bath. The vessel is sealed and heated at 100° C. for eight hours, after which it is cooled and opened. The reaction mixture is filtered to separate the crude white crystalline product which is then washed with 100 parts of cold methanol. The yield of crude, N,N'-di-n-octyldithioadipamide, M. P. 110–114° C., is 33.5 parts or 85% of the theoretical. Purified by crystallization from methanol, the white crystalline N,N'-di-n-octyldithioadipamide melts at 113–114° C. Analysis: Calculated for $C_{22}H_{44}N_2S_2$: S, 15.99%. Found: S, 15.23%, 15.37%.

Example III

N,N'-dicyclohexyldithioadipamide

Twenty-six and eight-tenths (26.8) parts of cyclohexylamine, 10.8 parts of adiponitrile, and 90 parts of ethyl alcohol are placed in a pressure vessel and saturated with hydrogen sulfide while the vessel is cooled in an ice bath. The vessel is sealed and heated at 100° C. for eight hours, after which it is cooled and opened. The solution obtained is added to twice its volume of water, and the water-insoluble material is taken up in ether. The ether is evaporated off, leaving an oily residue which is taken up in an equal volume of methanol. Water is added to turbidity, and the solution is cooled and stirred. The white crystalline N,N'-dicyclohexyldithioadipamide which separates is collected on a filter and purified by crystallization from methanol. It melts at 168–168.5° C. Analysis: Calculated for $C_{18}H_{32}N_2S_2$: S, 18.82%. Found: S, 19.21%.

Example IV

1,1'-dipentamethylenedithioadipamide

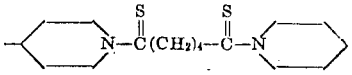

Fifteen and three-tenths (15.3) parts of piperidine, 6.5 parts of adiponitrile, and 50 parts of ethyl alcohol are placed in a pressure vessel and saturated with hydrogen sulfide while the vessel is cooled in an ice bath. The vessel is sealed and heated at 100° C. for eight hours, after which it is cooled and opened. The reaction mixture is filtered to separate the white crystalline product. Purified by crystallization from methanol, it melts at 149–150° C. Analysis: Calculated for $C_{16}H_{28}N_2S_2$: S, 20.51%. Found: S, 20.73%.

In this process the temperature may range from that at which the reaction begins to be detectable, usually around 50° C., up to the decomposition temperature of the normal reaction products, which may be as high as 250° C. and in some instances even higher. Best results are usually obtained in closed systems under superatmospheric pressure in the presence of liquid diluents which have been saturated with hydrogen sulfide, though the reaction may also be conducted in the absence of a diluent, the reactants acting as solvents for the hydrogen sulfide. The liquid diluent, if used, should be chemically inert to reactants and products and a solvent for the reactants, but may be a solvent or non-solvent for the product. Suitable diluents include n-butyl alcohol, the amyl alcohols, dioxan, toluene, xylene, benzene, beta-methoxyethanol, ethyl alcohol, diethyl ether, and chlorobenzene. The process is not limited to the ratio of reactants disclosed in the examples given. However, slight excesses of amine and hydrogen sulfide are preferably used with the exception of ammonia which need be used only in catalytic amounts.

The process of the present invention is generically applicable to the preparation of thioamides from aliphatic polynitriles having a chain of at least three carbon atoms between the nitrile groups. The polyvalent radical joining the nitrile groups may be saturated or unsaturated and may carry substituent groups providing these do not interfere with the reaction. Specific polynitriles suitable for use in this invention include the following: glutaronitrile, alpha-methylglutaronitrile, beta-methylglutaronitrile, beta-ethylglutaronitrile, beta-hexylglutaronitrile, pimelonitrile, suberonitrile, azelaonitrile, sebaconitrile, decamethylenedicyanide, camphoronitrile, beta-ketopimelonitrile, adiponitrile, alpha, alpha'-dimethyladiponitrile, 1,4-dicyanocyclohexane, 1,4-dicyano-2-butene, 2-methyl-4-bromo-1,4-dicyanopentane, and 1,3,15-tricyanopentadecane. Dinitriles are preferred. Those dinitriles having a divalent aliphatic hydrocarbon chain of at least three carbon atoms between the nitrile groups are greatly preferred.

As for the ammonia-type reactant, the process is generically applicable to ammonia-type compounds having one and only one ammonia-type nitrogen attached to at least one hydrogen atom and, when the number of hydrogens is less than three, attached, through aliphatic carbon, to not more than one organic radical having a valence of three minus the number of hydrogen atoms on the ammonia-type nitrogen, i. e. to compounds of the type

wherein $R^1$ and $R^2$ are hydrogen, or one of them is hydrogen and the other is a monovalent organic radical attached to the nitrogen by aliphatic carbon, or $R^1$ and $R^2$ together form a divalent radical joined by aliphatic carbons to the nitrogen atom thereby forming a heterocyclic ring. $R^1$ or $R^2$, when a single radical, may be aliphatic (including alicyclic) or aromatic, but, when the latter, must be attached to the ammonia-type nitrogen by aliphatic carbon. The invention is thus applicable to the use of ammonia, morpholine, n-ocylamine, cyclohexylamine, hexamethyleneimine, methylamine, thiomorpholine, ethylamine, n-propylamine, n-butylamine, isobutylamine, secondary butylamine, n-amylamine, n-hexylamine, 3-amino-n-hexane, n-heptylamine, 2-amino-n-heptane, n-nonylamine, n-decylamine, n-dodecylamine, n-hexadecylamine, n-octadecylamine, 1-amino-2-butene, 4-amino-1-pentene, 5-amino-1-hexene, cyclobutylamine, cyclopentylamine, cycloheptylamine, benzylamine, 1,2,3,4-tetrahydro-1-naphthylamine, furfurylamine, pyrroline, pyrrolidine, and the like.

The thioamides from ammonia are primary thioamides inasmuch as only one hydrogen of ammonia is replaced in the amide. The thioamides from primary amines are secondary thioamides inasmuch as two ammonia hydrogens are replaced in the amide. The thioamides from the heterocyclic compounds such as piperidine are tertiary inasmuch as all the ammonia hydrogens are replaced.

The thioamides prepared as described herein may be used for many purposes, e. g., as intermediates for the preparation of other compounds, as agents for controlling economically harmful lower forms of life, or as agents to inhibit corrosion in lubricating oils.

The process herein described is a very simple method for the synthesis of thioamides. The products are generally obtained in good yields and may be readily separated by fractional crystallization from by-products and unchanged starting materials. This process can be carried out under a wide variety of conditions of temperature and pressure and in a wide variety of solvents. These variables may be adjusted for each particular thioamide to obtain the optimum yield of thioamide or to comply with available operating facilities. Moreover, in many cases the polynitrile necessary for the preparation of a certain thioamide is much more easily obtained in a pure state than the corresponding thioamide.

The products of the present invention are crystalline solids in general insoluble in aqueous alkali. Thioamides of oxalic acid are so soluble in aqueous alkali as to have been regarded originally as acids and named as such—a property probably closely connected with the proximity of the carbothionamide groups to each other.

The above description and examples are intended to be illustrative only. Any modification of or variation therefrom which conforms to the spirit of the invention is intended to be included within the scope of the claims.

We claim:

1. An amide of a wholly aliphatic polycarbothionic acid, said acid having a chain of at least three carbon atoms between and contiguous with the thiocarbonyl groups.

2. A primary amide of a wholly aliphatic polycarbothionic acid, said acid having a chain of at least three carbon atoms between and contiguous with the thiocarbonyl groups.

3. A primary amide of a wholly aliphatic dicarbothionic acid having a chain of at least three carbon atoms between and contiguous with the thiocarbonyl groups.

4. Dithioadipamide.

5. A secondary amide of a wholly aliphatic polycarbothionic acid, said acid having a chain of at least three carbon atoms between and contiguous with the thiocarbonyl groups, the nitrogen of the carbothionamide groups being also attached to aliphatic carbon.

6. A secondary amide of a wholly aliphatic dicarbothionic acid, said acid having a chain of at least three carbon atoms between and contiguous with the thiocarbonyl groups, the nitrogen of the thioamide groups being also attached to aliphatic carbon.

7. An N,N'-dialkyl thioamide of a wholly aliphatic dicarbothionic acid, said acid having a chain of at least three carbon atoms between and contiguous with the thiocarbonyl groups.

8. N,N'-di-n-octyldithioadipamide.

9. Process which comprises reacting hydrogen sulfide, at a temperature between 50° C. and the decomposition temperature of the reaction product and in the presence of ammonia, with a wholly aliphatic dinitrile wherein the two nitrile groups are separated by a chain of at least three carbon atoms.

10. Process which comprises reacting hydrogen sulfide, at a temperature between 50° C. and the decomposition temperature of the reaction product and in the presence of ammonia, with adiponitrile.

11. Process which comprises reacting, at a temperature between 50° C. and the decomposition temperature of the reaction product, hydrogen sulfide and a primary alklamine with a wholly aliphatic dinitrile wherein the two nitrile groups are separated by a chain of at least three carbon atoms contiguous therewith.

12. Process which comprises reacting, at a temperature between 50° C. and the decomposition temperature of the reaction product, hydrogen sulfide and n-octylamine with a wholly aliphatic dinitrile wherein the two nitrile groups are separated by a chain of at least three carbon atoms contiguous therewith.

13. Process which comprises reacting, at a temperature between 50° C. and the decomposition temperature of the reaction product, hydrogen sulfide and n-octylamine with adiponitrile.

14. Process which comprises reacting hydrogen sulfide, at a temperature between 50° C. and the decomposition temperature of the reaction product and in the presence of ammonia, with a wholly aliphatic dinitrile wherein the two nitrile groups are separated by a hydrocarbon chain of at least three carbon atoms.

WILLIAM EDWARD HANFORD.
PAUL LAWRENCE SALZBERG.

CERTIFICATE OF CORRECTION.

Patent No. 2,280,578.   April 21, 1942.

WILLIAM EDWARD HANFORD, ET AL.

It is hereby certified that error appears in the printed specification of the above numbered patent requiring correction as follows: Page 2, second column, line 30, for "1,1'-dipentamethylenedithioadipamide" read --1,1'-thioadipyl-bis(piperidine)--; and that the said Letters Patent should be read with this correction therein that the same may conform to the record of the case in the Patent Office.

Signed and sealed this 30th day of June, A. D. 1942.

(Seal)

Henry Van Arsdale,
Acting Commissioner of Patents.